United States Patent
Fournie et al.

(10) Patent No.: US 7,464,508 B2
(45) Date of Patent: Dec. 16, 2008

(54) SELF-STIFFENED PANELS OF PREIMPREGNATED COMPOSITE AND MANUFACTURING PROCESS FOR COMPONENTS OF SUCH PANELS

(75) Inventors: Ludovic Fournie, Toulouse (FR); Claude Herve, Saint Sebastien sur Loire (FR); Frédéric Fort, Toulouse (FR)

(73) Assignee: Airbus France, Toulouse (FR)

( * ) Notice: Subject to any disclaimer, the term of this patent is extended or adjusted under 35 U.S.C. 154(b) by 568 days.

(21) Appl. No.: 10/992,221

(22) Filed: Nov. 18, 2004

(65) Prior Publication Data

US 2005/0178083 A1    Aug. 18, 2005

(30) Foreign Application Priority Data

Dec. 4, 2003   (FR)   ................... 03 14254

(51) Int. Cl.
    *E04C 1/00*   (2006.01)
(52) U.S. Cl. .................... 52/309.1; 52/309.13
(58) Field of Classification Search ............... 52/782.1, 52/309.1–309.16, 474, 506.01, 600, 608, 52/609, 380, 381, 334, 336, 212, 214, 224, 52/226, 318, 415, 424, 425
    See application file for complete search history.

(56) References Cited

U.S. PATENT DOCUMENTS

| | | | | | |
|---|---|---|---|---|---|
| 793,358 | A | * | 6/1905 | Doyle | 52/782.1 |
| 3,579,937 | A | * | 5/1971 | Lukens | 52/309.8 |
| 3,757,481 | A | * | 9/1973 | Skinner | 52/265 |
| 3,778,949 | A | * | 12/1973 | Hellerich | 52/309.7 |
| 4,256,790 | A | * | 3/1981 | Lackman et al. | 428/73 |
| 4,331,495 | A | * | 5/1982 | Lackman et al. | 156/93 |
| 4,718,214 | A | * | 1/1988 | Waggoner | 52/783.19 |
| 4,826,381 | A | * | 5/1989 | Kiriyama | 411/443 |
| 4,981,481 | A | * | 1/1991 | Kranz et al. | 606/62 |
| 5,009,664 | A | * | 4/1991 | Sievers | 606/60 |
| 5,015,168 | A | * | 5/1991 | Boime et al. | 425/389 |
| 5,538,589 | A | * | 7/1996 | Jensen et al. | 156/581 |
| 5,758,463 | A | * | 6/1998 | Mancini, Jr. | 52/309.12 |
| 6,081,955 | A | * | 7/2000 | Dumlao et al. | 14/73 |
| 6,099,768 | A | * | 8/2000 | Strickland et al. | 264/46.4 |
| 6,168,362 | B1 | * | 1/2001 | Tucker et al. | 411/442 |
| 6,408,594 | B1 | * | 6/2002 | Porter | 52/794.1 |
| 6,467,118 | B2 | * | 10/2002 | Dumlao et al. | 14/73 |

(Continued)

FOREIGN PATENT DOCUMENTS

GB   2 105 254   3/1983

*Primary Examiner*—Richard E Chilcot, Jr.
*Assistant Examiner*—Andrew J Triggs
(74) *Attorney, Agent, or Firm*—Patterson, Thuente, Skaar & Christensen, P.A.

(57) ABSTRACT

A self-stiffened panel of preimpregnated composite. The panel is of a type including a base skin on one side of which are added and placed side-by-side U-shaped stiffeners of which the parts connecting the branches of the U are flattened against the skin, with an interfacing structure between the adjoining branches of two adjacent stiffeners The interfacing structure is a nail having a nail-head comprised of a cord of filling resin. The nail is formed from a band with a rectangular cross-section whose edge, on the skin side, is directly in contact with the adjoining surface of the skin. The nail-head is comprised of two half-nail-heads placed symmetrically in the angle formed between the skin and the nail.

3 Claims, 4 Drawing Sheets

U.S. PATENT DOCUMENTS

| | | | |
|---|---|---|---|
| 6,553,734 B1 * | 4/2003 | McKague et al. | 52/309.1 |
| 6,571,523 B2 * | 6/2003 | Chambers | 52/309.2 |
| 6,620,484 B1 * | 9/2003 | Bolukbasi et al. | 428/102 |
| 6,668,507 B2 * | 12/2003 | Blanchet | 52/601 |
| 6,688,073 B2 * | 2/2004 | VanderWerf et al. | 52/745.09 |
| 7,270,722 B2 * | 9/2007 | Navas et al. | 156/214 |

\* cited by examiner

SELF-STIFFENED PANELS OF PREIMPREGNATED COMPOSITE AND MANUFACTURING PROCESS FOR COMPONENTS OF SUCH PANELS

RELATED APPLICATION

The present application claims priority to French Application No. 03 14254 filed Dec. 4, 2003.

TECHNICAL FIELD

This invention concerns the manufacture of self-stiffened panels comprised of layers of preimpregnated fibers, and intended for construction of wing panels and fuselage boxes for example.

BACKGROUND OF THE INVENTION

In FIG. 1, a cross-section of the self-stiffened, preimpregnated composite panel comprised of a base skin 1, on one face of which are added U-shaped stiffeners 2 placed parallel and side-by-side and each of them separated by an interfacing structure including a nail 3 and a nail-head 4 between them, the nail being formed of two half-nails 3a and 3b placed symmetrically, and the nail-head 4 filling in the space remaining between the skin 1, on the one hand, and the edges adjoining the half-nails 3a and 3b, on the other hand, is represented.

The skin 1, and also the U-shaped stiffeners 2 and the half-nails 3a and 3b, are comprised of superimposed plies formed of fabric or layers of carbon fibers preimpregnated with an appropriate resin. The stiffeners 2, the half-nails 3a and 3b, and the nail-heads 4 generally run the entire length of the panel.

An object of the invention is to simplify and perfect the type of panel shown in FIG. 1.

More specifically, the self-stiffened panels that are the subject of this invention are of a type comprised of a skin generally formed by several superimposed plies of preimpregnated carbon fibers, with the addition of U-shaped stiffeners added side-by-side, parts joining the branches of the U that are flattened against said skin with interposition, between the adjoining branches of two adjacent stiffeners, of an interfacing structure commonly called a "nail," completed by a "nail-head" comprised of a cord of filling resin.

Still more specifically, the present invention aims to simplify and perfect the type of panel with U-shaped stiffeners illustrated in FIG. 1 from the attached drawings whose interfacing structure includes a nail formed of two half-nails placed symmetrically and a nail-head placed between the edges adjoining the half-nails, and involves a particular step of forming the half-nails.

SUMMARY OF THE INVENTION

For this purpose, the subject of the invention is a self-stiffened panel of preimpregnated composite of a type made of a base skin, on one of the faces of which are added and arranged side-by-side U-shaped stiffeners of which the parts joining the branches of the U are flattened against said skin with interposition, between the adjoining branches of two adjacent stiffeners, of an interfacing structure commonly called a "nail," completed by a "nail-head" comprised of a cord of filling resin, characterized by the fact that said nail is formed from a band with a rectangular section, the skin side edge of which is directly in contact with the adjoining side of said skin, and in that the head of the nail is comprised of two half-nail-heads arranged symmetrically in the angle formed between the skin and the nail.

According to a first manufacturing method, said band forming the nail is a solid piece and comprised of at least one ply of preimpregnated carbon fibers.

According to a second manufacturing method, said band forming the nail is formed of two components or half-nails, placed side-by-side, each formed of at least one ply of preimpregnated carbon fibers.

The manufacturing process for these two manufacturing methods is also the subject to the invention.

Accordingly, a subject of the invention is a manufacturing process for components of a self-stiffened panel of preimpregnated composite of a type comprised of a base skin on one side of which are added and placed side-by-side U-shaped stiffeners of which the parts connecting the branches of the U are flattened against said skin, with interposition, between the adjoining branches of two adjacent stiffeners, of an interfacing structure commonly called a "nail", completed by a "nail-head" comprised of a cord of filling resin, said nail being a single piece and said nail-head being comprised of two half-nail-heads placed symmetrically in the angle formed between the skin and said nail, characterized by the following steps:

draping several superimposed plies of preimpregnated carbon fiber to make up said base skin;

installing and forming on individual punches with a U-shaped section and rounded corners and a length corresponding to that of the U-shaped stiffeners of the panel being made, of at least one reinforcing ply of preimpregnated carbon fibers;

construction of a nail comprised of a band, the length of which corresponds to that of the U-shaped stiffeners and a width equal to the height of the branches of said U by draping at least one ply of preimpregnated carbon fibers;

positioning punches side-by-side in inverted U position with interposition of said nail;

placement of two half-nail-heads for the aforementioned nail on both sides of each nail between the latter and said reinforcing ply;

compaction of the set of punches thus placed side-by-side;

180° rotation of the set of compacted punches;

positioning of this unit on said base skin in a manner to flatten against the latter a continuous flat surface defined, in part, by the outer side of the parts connecting the branches of the stiffeners' U, and in part by the "nail+nail-head" unit separating two adjacent stiffeners;

and, finally, withdrawal of said U-shaped punches.

The subject of the invention is also a manufacturing process for components of a self-stiffened panel of preimpregnated composite of a type comprised of a base skin on one side which are added and placed side-by-side U-shaped stiffeners of which the parts connecting the branches of the U are flattened against said skin, with interposition, between the adjoining branches of two adjacent stiffeners, of an interfacing structure commonly called a "nail", completed by a "nail-head" comprised of a cord of filling resin, said nail being made of two half-nails and said nail-head being comprised of two half-nail-heads placed symmetrically in the angle formed between the skin and said nail, characterized by the following steps:

installing and forming on individual punches with a U-shaped cross-section and rounded corners, and a length corresponding to that of the U-shaped stiffeners of the panel being made, of at least one reinforcing ply of preimpregnated carbon fibers;

construction of half-nails comprised of a band whose length corresponds to that of the U-shaped stiffeners and a width equal to the height of the branches of said U by draping at least one ply of preimpregnated carbon fibers;

placement of a half-nail on both vertical-sides of each punch covered by said reinforcing ply and in inverted U position, and a half-nail-head inserted between said reinforcing ply and the half-nail at the height of the rounded corner of said punch;

individual compaction of each punch coated this way;

individual 180° rotation of the punches;

then positioning of punches side-by-side on said base skin in a manner to flatten against the latter a continuous flat surface defined, in part, by the outer side of the parts connecting the branches of the stiffeners' U, and in part by the "nail+nail-head" unit separating two adjacent stiffeners;

and, finally, withdrawal of said U-shaped punches.

Such a manufacturing process for panel components is particularly appropriate for implementing panels with very large dimensions. Effectively, as will be seen in the detail farther on, the panels of the type according to said first manufacturing method require, during their fabrication, a phase of rotation a unit, specifically the tool bearing the set of U-shaped stiffeners, which poses problems for handling and also tooling, because of their size.

The panel manufacturing process according to said second manufacturing method avoids all handling of heavy and large units because the rotation operations consist of handling, and notably rotation, only individual punches, one after the other.

Other properties and advantages will come out of the following description of the invention's manufacturing methods, a description being given solely as an example, and in viewing the attached drawings.

DETAILED DESCRIPTION OF THE DRAWINGS

Figure 1:
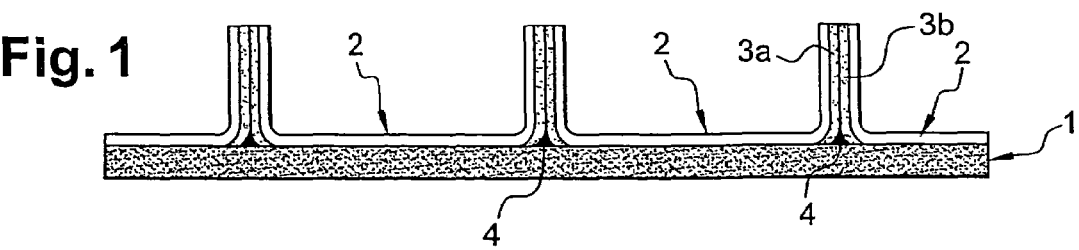
FIG. 1 is a partial cross-section of the self-stiffened panel with the U-shaped stiffeners added to a base skin.
Figure 2:
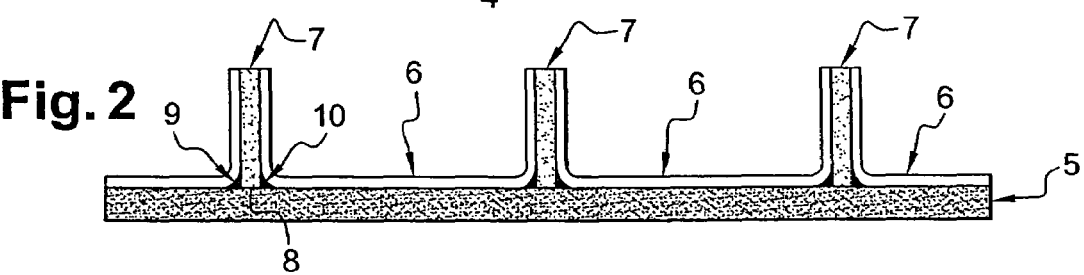
FIG. 2 is a partial cross-section of a panel from the invention according to the first manufacturing method.
Figure 9:
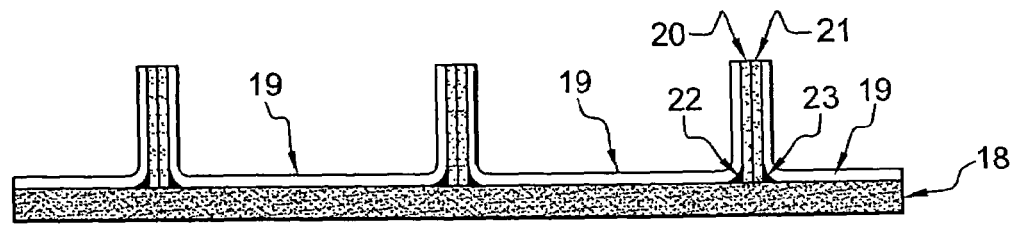
FIG. 9 is a partial cross-section of a panel from the invention according to the second manufacturing method.

To simplify and perfect the type of panel shown in FIG. 1 as described above, replacing the unit of nails 3a and 3b, which require a special step of forming along one of the longitudinal edges, by a flat nail made following a first variant illustrated by FIG. 2 or according to a second variant illustrated by FIG. 9 is proposed.

In the implementation method from FIG. 2, the panel includes a base skin 5, on one face of which are added U-shaped stiffeners 6, between which is placed a single-piece nail 7 with a rectangular cross-section whose edge 8 is placed directly against the adjoining face of skin 5 with half-nail-heads 9 and 10 filling the spaces arranged in the angles formed between the skin 5 and the nails 7 under the stiffeners 6.

Now we will describe the process according to the invention for manufacturing components making up the panel of FIG. 2, during its manufacturing.

Figure 3:
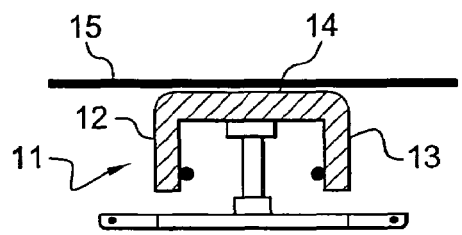
FIG. 3 illustrates the placement of a ply on a punch with a U-shaped cross-section.

In FIG. 3 a punch at 11 is shown whose cross-section is U-shaped defining three flat outer surfaces that are orthogonal or parallel to each other; respectively the surfaces 12 and 13 correspond to the two parallel branches of the U and a connecting surface 14.

The punch 11 has a length at least equal to that of the stiffeners 6 to be made and is placed in the position of an inverted U for the placement of the superimposed plies shaped in rectangular bands before making up the stiffeners.

Figure 15:
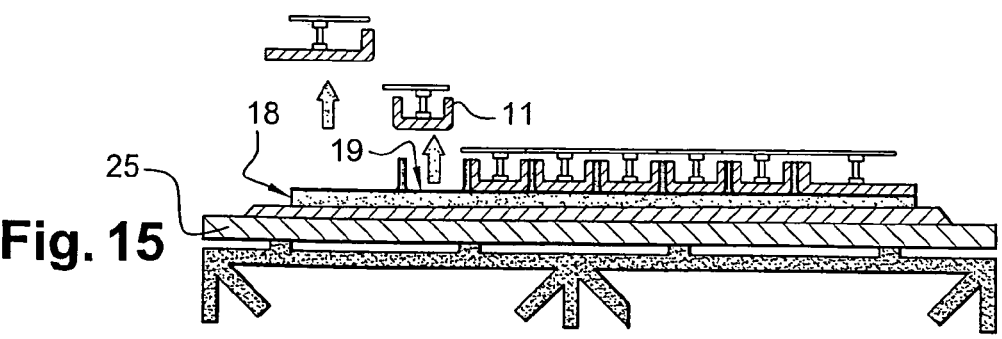

FIG. 15 shows a cross-section of such a superposition made by draping and forming a band whose length is equal to that of the U-shaped stiffener to be made.

The band 15 is placed astride punch 11 as illustrated, previously coated with a polyethylene film (not shown) to avoid sticking of the band 15 and allowing the later withdrawal of the punch, in order to form under infrared the U-shaped stiffener while flattening the edges of the band 15 on the sides 12 and 13 of the punch; the longitudinal edges of the band are cut to fit the height of the said sides.

Figure 4:
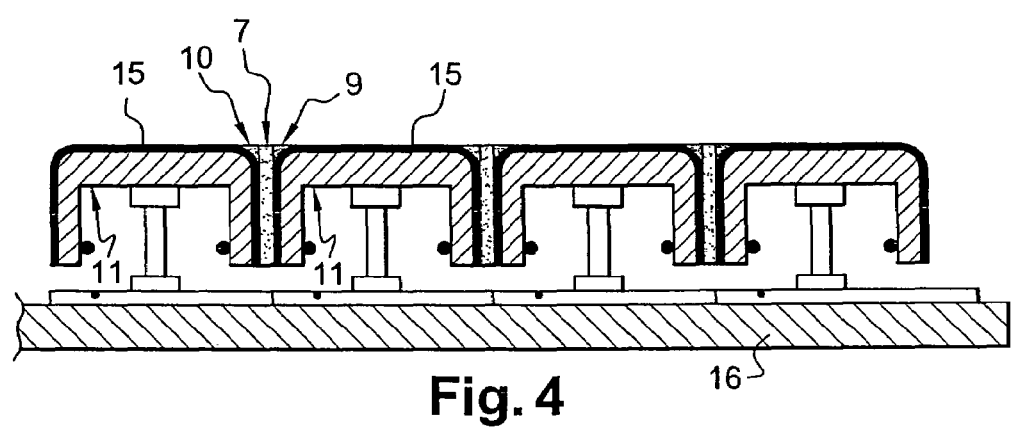
FIG. 4 illustrates the placement of the nail and two nail half-nail-heads between two punches.

FIG. 4 illustrates the following step of placing side-by-side on a tool 16 the punches 11 coated this way with band 15, with the interposition between two punches 11 of a nail 7, previously made by draping one or more plies of preimpregnated carbon fibers and cutting to the dimensions of the sides 12 and 13 of the punches. The half-nail-heads 9 and 10 are placed last. Next, a bladder (not shown) is placed on the assembly and vacuum is applied to compact the components 7, 9, 10, and 15, in order to have a surface that is as uniformly flat as possible and without spaces or empty interstices near the nail-nail-head unit.

Figure 5:
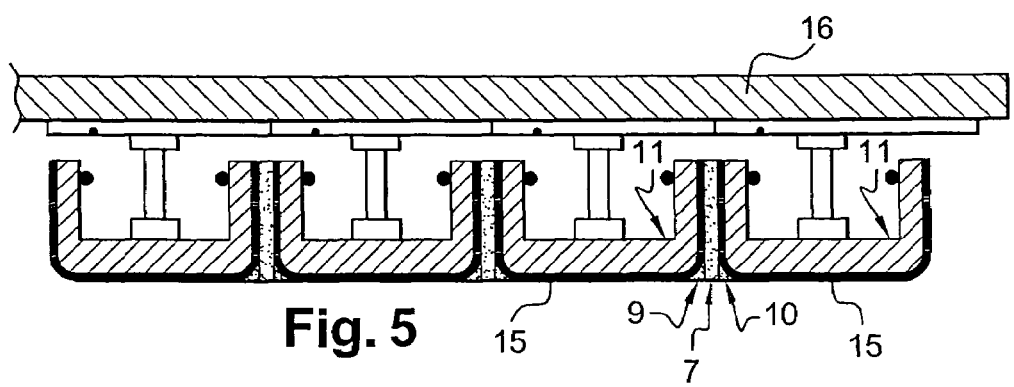
FIG. 5 illustrates the rotation by 180° of the set of punches from FIG. 4.
Figure 6:
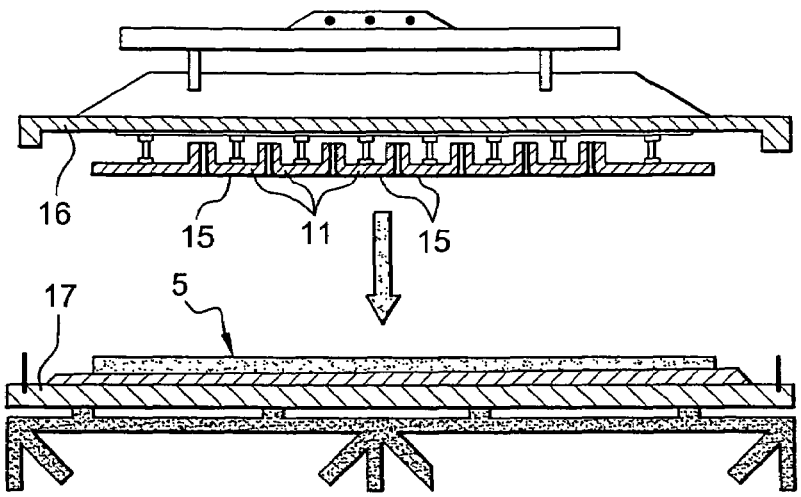
FIGS. 6, 7 and 8 illustrate the final steps of placing the stiffeners-nails-nail-heads unit from FIG. 5 on a base skin and withdrawing the punches.

The following step consists of rotation by 180° (FIG. 5) the set of punches, and then bringing (FIG. 6) the punches' 11 mounting plate 16 over the basic skin 5 placed on its waiting surface plate 17.

Figure 7:
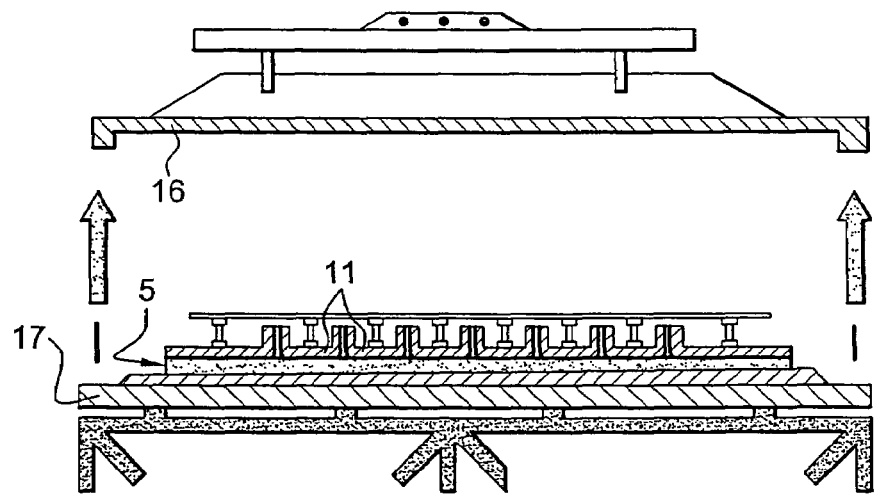
Figure 8:
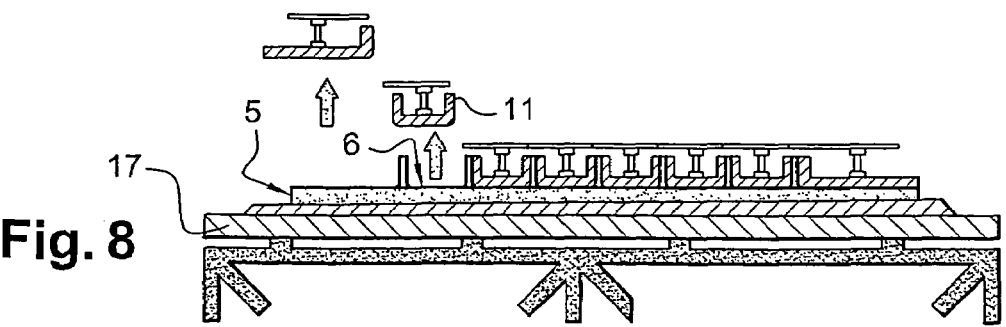

Next, the set of punches 11 is placed on the skin 5 (FIG. 7) and, finally, the punches 11 are lifted away one after the other (FIG. 8) in order to obtain an assembly structure, according to FIG. 2, which it is next appropriate to strengthen in an autoclave in the normal manner.

FIG. 9 shows a panel from the invention according to the second manufacturing method.

The panel from FIG. 9 includes a base skin 18, to one face of which are added U-shaped stiffeners 19, between which are placed two half-nails 20 and 21 placed side-by-side their entire length, the edges of the half-nails being flattened directly against the adjoining side of skin 18, the half-nail-heads 22 and 23 filling the spaces set up in the angles formed between the skin 18 and the half-nails 20 and 21 under the stiffeners 19.

Now we will describe the process according to the invention for manufacturing components making up the panel of FIG. 9 during its manufacturing.

After placing a band 15 astride a punch 11 to make up a stiffener 19, this placement being done as shown by FIG. 3, half-nails 20 and 21 previously draped and cut out are placed (FIG. 10) on the two sides of punch 11 covered with band 15.

Once the half-nails 20 and 21 are in place, the two half-nail-heads 22 and 23 are positioned in the empty spaces existing between the band 15 and the half-nails 20 and 21.

Next, a bladder (not shown) is placed on the assembly and vacuum is applied to compact the components 20, 21, 22, 23 and 15.

The same operations are performed on as many punches 11 as there are stiffeners 19 to be positioned on the skin 18.

Figure 10:
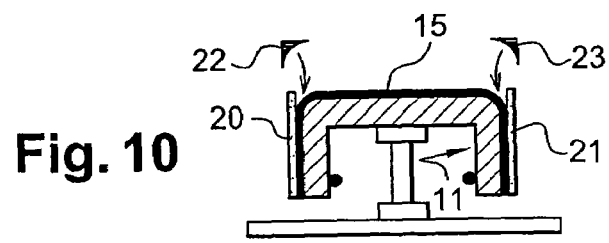
FIG. 10 illustrates the placement of the half-nails and half-nail-heads for the panel from FIG. 9 on a punch.
Figure 11:
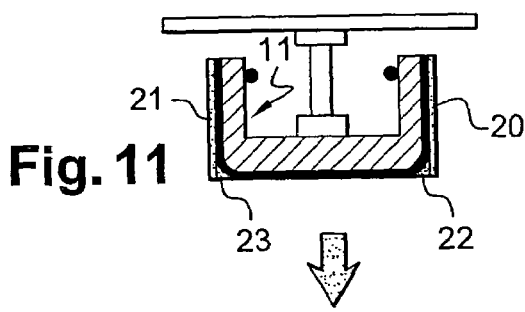
FIG. 11 illustrates the individual rotation by 180° of the punch.

The following step is the individual rotation of the punches 11 by 180° as illustrated by the passage from FIG. 10 to FIG. 11 in order for their placement side-by-side (FIG. 12) on a surface plate 24.

Figure 13:
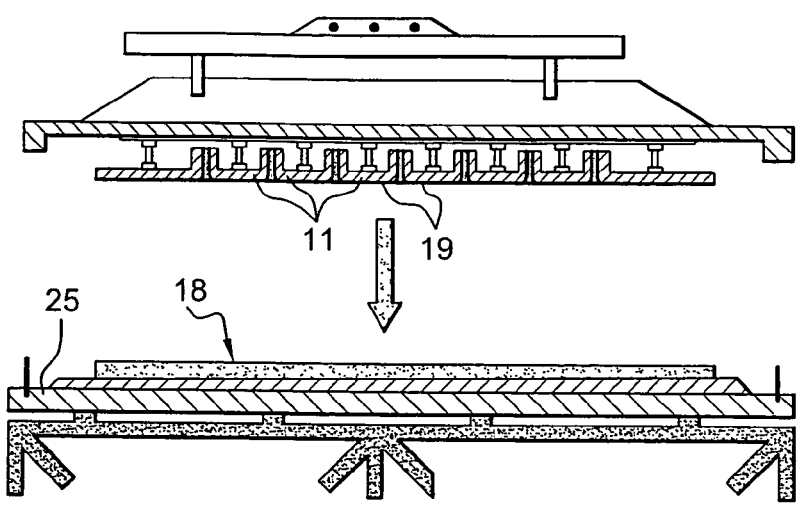
FIGS. 13 to 15 illustrate the final steps of placing the stiffeners-nails-nail-heads unit from FIG. 12 on a base skin and withdrawing the punches.

Next, the assembly of punches 11 is taken-on and lifted using an overhead crane (FIG. 13) in order to be placed (FIG. 14) on the skin 18 previously prepared by draping in a well-known manner and waiting on its surface plate 25, and, finally, the punches 11 are lifted away one after the other (FIG. 15) in order to obtain an assembly structure, according to FIG. 9, which it is next appropriate to strengthen in an autoclave in the normal manner.

Such a process for placing panel components according to FIG. 9 presents the following substantial advantages compared to that necessary for the implementation of the panel according to FIG. 1:

The gathering (FIG. 12) of the stiffening components (19) in the position (U-shaped punches 11' in the upright U position) corresponding to their placement for setting down on the base skin 18 is done by individually rotating the punches after the step of compacting the components 20, 21, 22, 23 and 15 on each punch. Such a manipulation is done easily and does not require unusual equipment.

In contrast, in the case of the panel from FIG. 1 the nail-heads 4 can only be put in place and then subjected to compacting on the complete assembly of punches for shaping the stiffeners which must then be in an inverted U position and placed side-by-side. It is then necessary, after compacting all of the punches as a whole, to rotate 180° to put them in position for placement on the base skin 1. This manipulation requires means of sufficient scale and space to perform the rotation of an assembly of large dimensions when it involves a large-size panel.

The half-nails 20 and 21 are simple flat rectangular bands more simple and easy to implement than the half-nails 3a and 3b with flanged edges at the height of the nail-heads 4, requiring a prior compacting phase.

Figure 12:
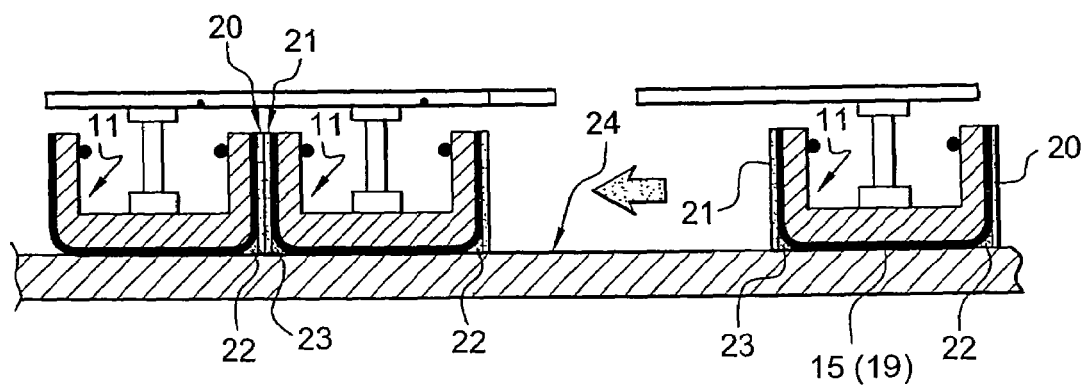
FIG. 12 illustrates the placement side-by-side after rotation the punches.
Figure 14:
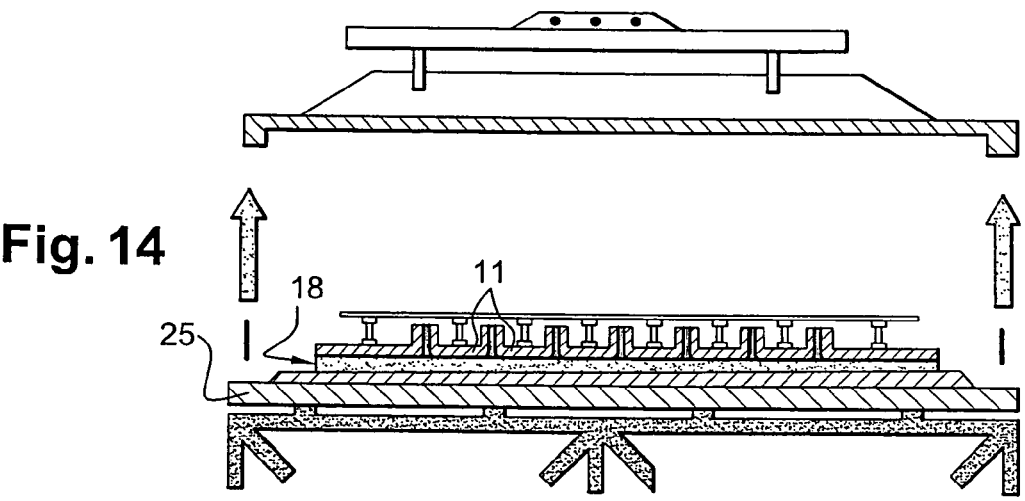

It should be noted that the step of placing the punches 11 side-by-side on the surface plate illustrated by FIG. 12 can be eliminated by positioning the punches 11 one after the other directly on the skin 18 placed on its surface plate 25 (FIG. 14).

It should also be noted that the type of panel from FIG. 2 is preferably reserved for manufacturing of panels not having overly large dimensions because of the fact that the process for putting the constituent components in place is analogous to that of the panel from FIG. 1, with the same inconveniences that were just reviewed.

When it comes to making panels with larger dimensions, the type of structure of FIG. 9 is therefore preferred.

Finally, generally speaking, the mechanical makeup of the panels from the invention, notably around the areas at the corner of the stiffeners, is identical to that of panels conforming to FIG. 1, whatever the manufacturing method selected.

What is claimed is:

1. A self-stiffened panel of preimpregnated composite having a base skin, a first side of the base skin comprising:
    a plurality of substantially U-shaped stiffeners, each stiffener presenting two branches coupled by a connecting portion, the connecting portion being flattened against the first side of the base skin; and
    an interfacing structure interposed between branches of adjacent stiffeners, the interfacing structure comprising a nail having a nail-head comprising a cord of filling resin, wherein the nail is formed from a band having a rectangular cross-section and an edge in direct contact with the base skin, and wherein the nail-head comprises two half-nail-heads positioned substantially symmetrically in an angle formed between the base skin and the nail.

2. The panel of claim 1, wherein the band forming the nail is a single structure comprising at least one ply of preimpregnated carbon fibers.

3. The panel of claim 1, wherein the band forming the nail comprises two half-nails arranged side-by-side, each half-nail comprising at least one ply of preimpregnated carbon fibers.

* * * * *